US012756274B2

(12) United States Patent
Contet

(10) Patent No.: US 12,756,274 B2
(45) Date of Patent: Oct. 6, 2026

(54) OVERMOLDED TARGET FOR A MOTOR VEHICLE

(71) Applicant: Continental Automotive Technologies GmbH, Hannover (DE)

(72) Inventor: Hervé Contet, Lamasquère (FR)

(73) Assignee: CONTINENTAL AUTOMOTIVE TECHNOLOGIES GMBH, Hannover (DE)

(*) Notice: Subject to any disclaimer, the term of this patent is extended or adjusted under 35 U.S.C. 154(b) by 186 days.

(21) Appl. No.: 18/787,236

(22) Filed: Jul. 29, 2024

(65) Prior Publication Data

US 2025/0088077 A1 Mar. 13, 2025

(30) Foreign Application Priority Data

Sep. 11, 2023 (FR) ....................................... 2309544

(51) Int. Cl.

*H02K 11/20* (2016.01)
*H02K 11/00* (2016.01)
*H02K 15/12* (2006.01)

(52) U.S. Cl.

CPC ......... *H02K 11/0094* (2013.01); *H02K 11/20* (2016.01); *H02K 15/12* (2013.01)

(58) Field of Classification Search

CPC G01D 5/24438; G01D 5/24442; G01P 1/026; G01P 3/488; G01P 3/00; G01P 3/42; G01P 3/44

See application file for complete search history.

(56) References Cited

U.S. PATENT DOCUMENTS

| | | | | |
|---|---|---|---|---|
| 6,339,964 | B1 * | 1/2002 | Bertetti | G01P 3/487 73/862.334 |
| 10,250,098 | B2 | 4/2019 | Leiber et al. | |
| 11,953,089 | B1 * | 4/2024 | Hutcheon | G01P 3/488 |
| 2013/0038319 | A1 * | 2/2013 | Gayney | G01P 3/488 324/160 |
| 2013/0145847 | A1 * | 6/2013 | Martin | G01P 13/04 73/514.39 |
| 2017/0108526 | A1 * | 4/2017 | Boldt | G01P 3/488 |
| 2023/0258262 | A1 * | 8/2023 | Hutcheon | F16H 59/42 475/158 |

FOREIGN PATENT DOCUMENTS

| | | | | |
|---|---|---|---|---|
| EP | 0908730 | A1 | 4/1999 | |
| FR | 3144443 | A1 * | 6/2024 | H02K 11/225 |
| WO | WO-2009081033 | A2 * | 7/2009 | H02K 29/08 |

OTHER PUBLICATIONS

WO-2009081033-A2 Machine Translation (Year: 2009).*
FR-3144443-A1 Machine Translation (Year: 2024).*
International Preliminary Report on Patentability issued on Mar. 7, 2024, by République Française, INPI, France, in corresponding Application No. FR2309544, with machine translation. (12 pages).

* cited by examiner

*Primary Examiner* — Oluseye Iwarere
*Assistant Examiner* — Masoud Vaziri
(74) *Attorney, Agent, or Firm* — Buchanan Ingersoll & Rooney PC

(57) ABSTRACT

A target for a shaft of a motor vehicle, the target being configured to be mounted on a free end of said shaft and having at least one metal tooth, a body supporting the at least one metal tooth and a fixing element including an insertion portion configured to be inserted at least partly on the end of the shaft. The body being overmolded, at least in part, around the at least one tooth.

12 Claims, 5 Drawing Sheets

Prior Art

OVERMOLDED TARGET FOR A MOTOR VEHICLE

FIELD OF THE INVENTION

Cross Reference to Related Applications

This application claims priority to French Application No. 2309544, filed Sep. 11, 2023, the contents of such application being incorporated by reference herein.

The present invention relates to the field of motor vehicles and more specifically relates to a target for a motor vehicle shaft and to a method for manufacturing same.

BACKGROUND OF THE INVENTION

In an automotive vehicle it is known practice to use a sensor with a drive shaft, for example for measuring the rotational speed thereof and for relaying this information to an electronic control unit of the vehicle for controlling it or a driver assistance feature. For example, in an electric motor vehicle, it is known practice to use such a sensor to measure the rotational speed of said electric motor in order to be able to control this motor.

This type of sensor comprises a sensitive element fixedly mounted on a structural element of the vehicle facing a metal target mounted on the end of the shaft to rotate as one therewith.

FIG. 1 schematically illustrates one example of a sensor assembly 10AA of the prior art. The assembly 10AA comprises a target 110AA, a sensor 120AA and a management module 130AA. The target 110AA comprises teeth 112AA extending from a central tubular portion 114AA mounted on a shaft 20AA of longitudinal axis XAA and rotating in a direction of rotation F. In this example, the teeth 112AA have different angular lengths 11, 12, 13, the same heights h1, h2, h3, and are spaced apart by different angular widths C1, C2, C3. The sensor 120AA comprises a sensitive element comprising a magnetized portion 121AA mounted on a support 122AA electrically connected to the management module 130AA. During operation, the passage of the metal teeth 112AA past the magnetized portion 121AA brings about a variation in the magnetic field and the generation of signals which are received by the management module 130AA which sends them to an electronic control unit (not visible) of the vehicle. The electronic control unit processes the signals in order to determine, for example, the angular position or the rotational speed of the shaft.

In the known way, such a target 110AA may be manufactured by pressing or by machining. When manufactured by pressing, the target 110AA exhibits tolerances which differ from one target 110AA to another and which on average are added to one another, thus rendering the sensor assembly 10AA somewhat inaccurate. When manufactured by machining, the tolerances prove on average to be smaller but a great deal of metal is lost because the original metal workpiece needs to have at least the diameter of the teeth 112AA of the target 110AA and all of the peripheral part of the tubular portion 114AA, which is of smaller diameter, needs to be removed.

A simple, reliable and effective solution allowing these drawbacks to be at least partially remedied would therefore be advantageous.

SUMMARY OF THE INVENTION

To this end, the invention relates first of all to a target for a shaft of a motor vehicle, said target being configured to be mounted on a free end of said shaft and comprising at least one metal tooth, a body supporting said at least one metal tooth and a fixing element comprising an insertion portion configured to be fixed at least partly on the end of the shaft, the target being notable in that the body is overmolded, at least in part, around the at least one tooth.

The overmolding of the metal teeth makes it possible to limit the amount of metal used, notably of metal removed by machining or pressing, and therefore reduce the cost of the target. The use of overmolding of the teeth makes the target easy and inexpensive to manufacture. Another advantage of the target according to the invention lies in the fact that the fixing element can be of different shapes and different diameters in order to suit any type of shaft while keeping the same body and therefore the same mold for manufacturing the body for the same configuration of teeth. Furthermore, the target according to the invention requires little metal either for the teeth or possibly for the fixing element, and this significantly reduces the cost of the target. Furthermore, the use of overmolding of the teeth makes it possible to reduce greatly, or even eliminate, the tolerances from one target to another when manufacturing a batch of targets, thus making the sensors using this target more accurate.

The end of the shaft preferably comprises a cylindrical, for example hollow cylindrical, portion.

In one form of embodiment, the fixing element comprises an attachment portion distinct from the insertion portion and equipped with at least one relief, the body being overmolded around said attachment portion.

As a preference, the attachment portion is of circular shape.

As a further preference, the at least one relief of the attachment portion is a rib, a notch or a striation.

In another form of embodiment, the fixing element and the body are derived from the same overmolding material.

According to one aspect of the invention, the body delimits at least one opening passing through said body as far as the fixing element so as to allow the use of an insertion tool for inserting the target in the end of the shaft and, in the case of a solution of the “press-fit” type, so as to allow liquid coolant to pass for versions of power unit that employ a liquid coolant and, in the case of a screw-fastened solution, to allow the use of a fixing screw for the body and for the fixing element.

As a preference, the teeth are made of stainless steel, of aluminum or of copper.

According to another aspect of the invention, the target comprises a plurality of teeth, preferably two, three, four or five teeth, overmolded in the body.

As a preference, the teeth are evenly distributed.

In one form of embodiment, the insertion portion of the fixing element is a sleeve of the “press-fit” type, preferably with an annular groove.

In another form of embodiment, the insertion portion of the fixing element is a tube of circular cross section and the target is configured to be fixed to the shaft using a screw.

According to one aspect of the invention, the body delimits at least one opening passing through said body and the fixing element, for example so as to allow the liquid coolant to pass for versions of power unit that employ a liquid coolant in the case of the “press-fit” solution, or to allow the use of a fixing screw in the case of the screw-fastened solution.

As a preference, the head of the screw is retained on the target by a retaining member, for example of the locking knurlings or notches type, so as to render the screw captive.

Advantageously, the material of the fixing element is magnetically and/or electrically neutral to detection by the sensor.

Advantageously too, the material of the fixing element is identical to the material of the body, thereby making it possible to reduce the distance between the sensor and the shaft, and therefore increase compactness.

The invention also relates to a motor vehicle comprising a drive shaft equipped with a target as set out above.

The invention also relates to a method for manufacturing a target as set out above, said method comprising the steps of positioning the at least one metal tooth in a lower part of a mold, placing the upper part of the mold on the lower part, and molding at least part of the body around the at least one metal tooth.

In one embodiment, the method comprises, prior to placing the upper part of the mold on the lower part, positioning the fixing element in such a way that its attachment portion is molded in the body.

BRIEF DESCRIPTION OF THE DRAWINGS

Further features and advantages of the invention will become more clearly apparent on reading the following description. This description is purely illustrative and is to be read with reference to the appended drawings, in which.

DETAILED DESCRIPTION OF EXEMPLARY EMBODIMENTS

Figure 1:
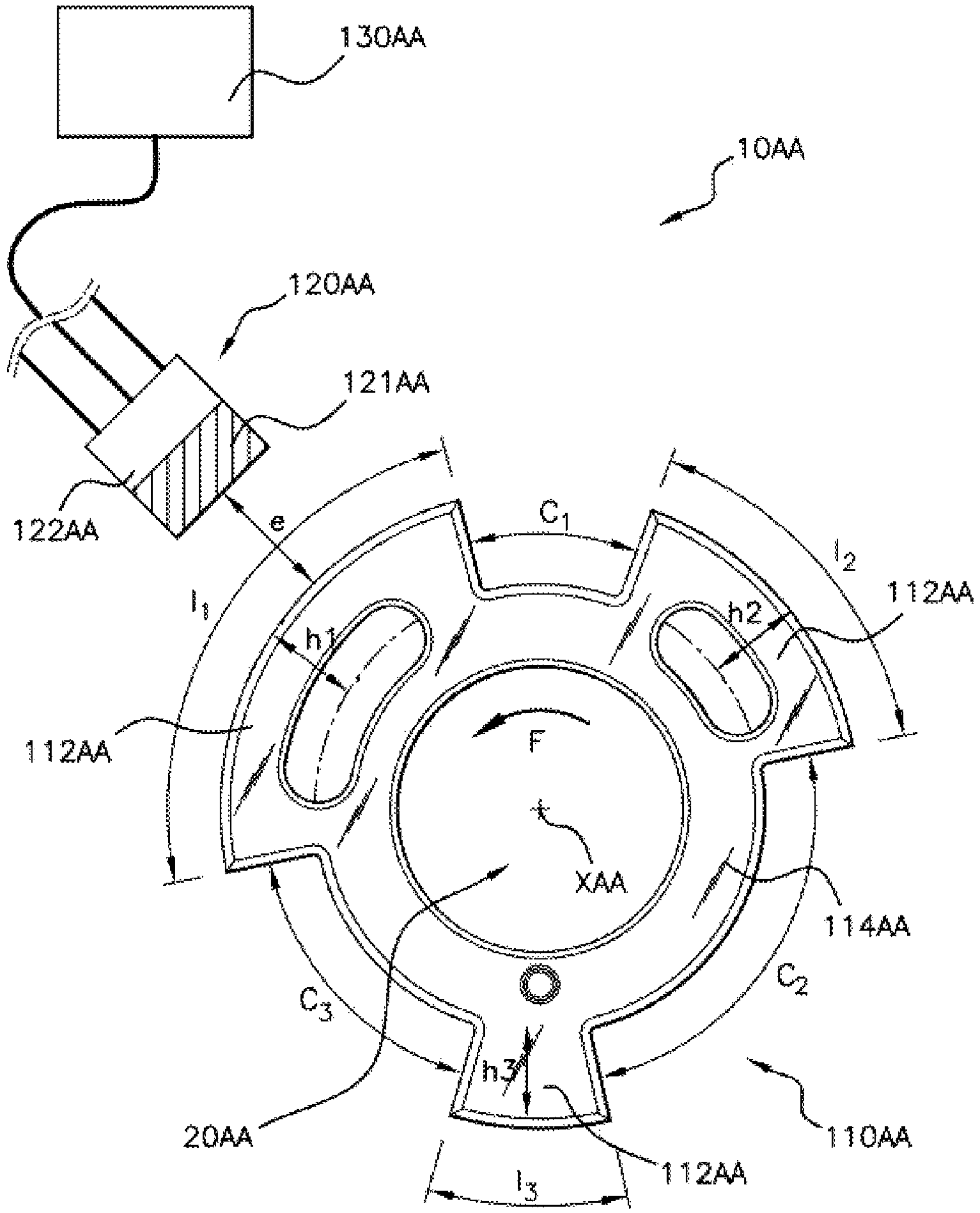
FIG. 1 schematically illustrates an example of a sensor assembly of the prior art.
Figure 2:
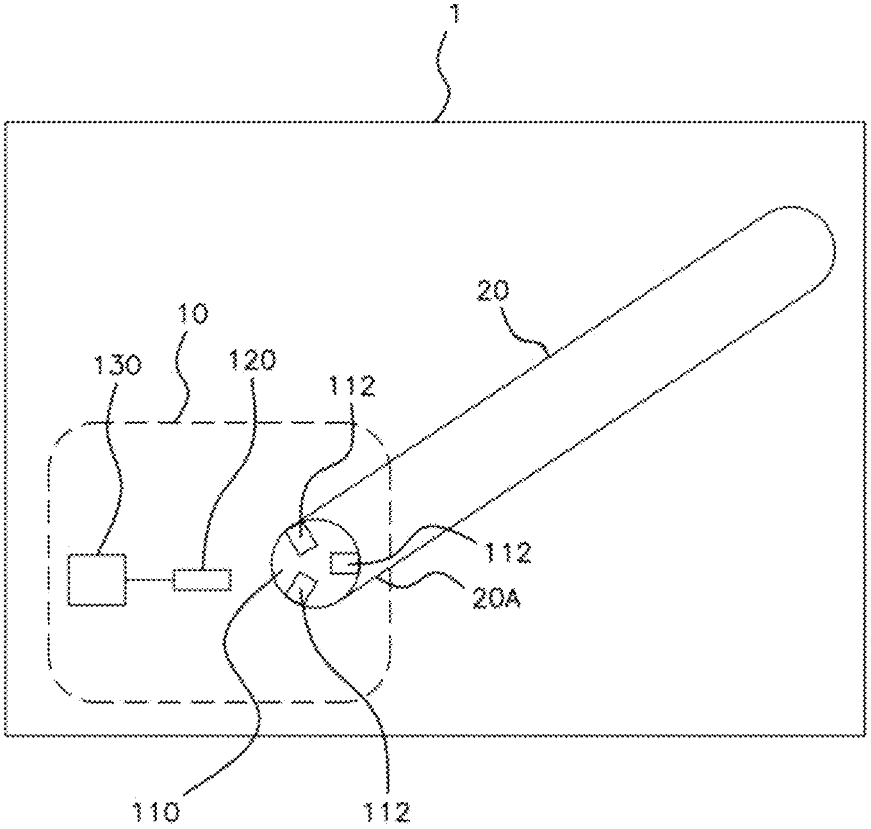
FIG. 2 schematically illustrates an example of a vehicle according to the invention.

FIG. 2 depicts a schematic example of a motor vehicle 1 according to the invention.

The vehicle 1 comprises a sensor assembly 10 and a rotary shaft 20, for example an electric-motor shaft of which the sensor assembly 10 is designed to measure the rotational speed.

The sensor assembly 10 comprises a target 110, a sensor 120 and a management module 130.

The target 110 is mounted on a free end 20A of the rotary shaft 20.

The sensor 120 is fixed (i.e. non-rotary) and is mounted in the vehicle 1 in line with the rotary target 110. The sensor 120 is able to measure the magnetic-field variations that are brought about when the shaft 20 is made to rotate. The sensor 120 notably comprises a sensitive element. Since the sensor 120 is known per se, it will not be described in more detail here.

The end 20A, of the shaft 20, on which the target 110 is mounted in this example comprises a hollow cylindrical portion (not visible), for example a tubular portion, allowing the mounting of the target 110.

FIGS. 3 to 8 illustrate two examples of a target 110 according to the invention.

The target 110 comprises at least one metal tooth 112 (for example made of stainless steel, of aluminum or of copper), a body 114 overmolded, at least in part, around the at least one tooth 112, and a fixing element 116 comprising an insertion portion 116A configured to be inserted at least in part on or into the hollow cylindrical portion of the end 20A of the shaft 20.

In the two examples of FIGS. 3 to 8, the insertion portion 116A has a hollow cylindrical shape of circular cross section.

Figure 3:
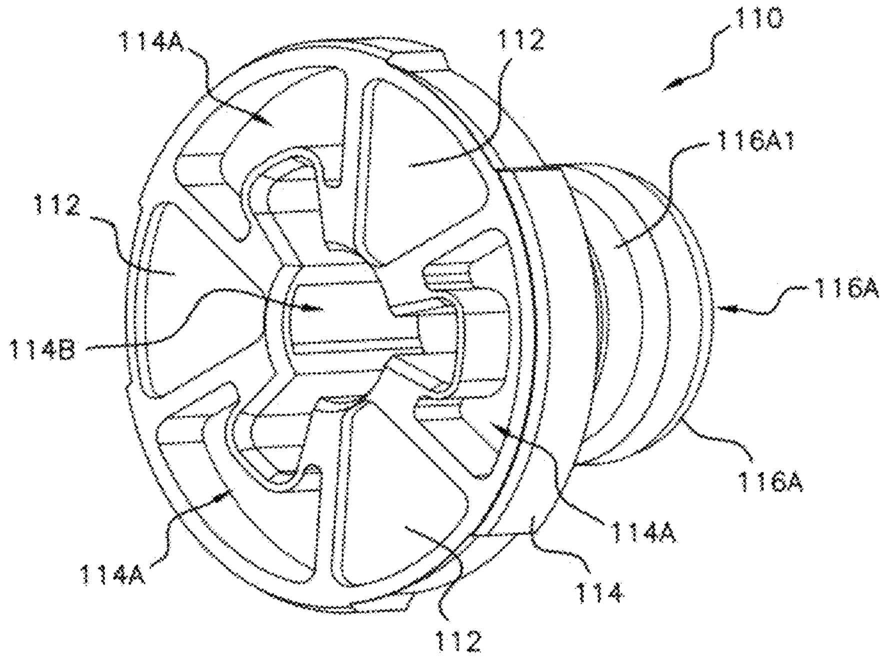
FIG. 3 is a front perspective view of a first example of a target according to the invention.
Figure 4:
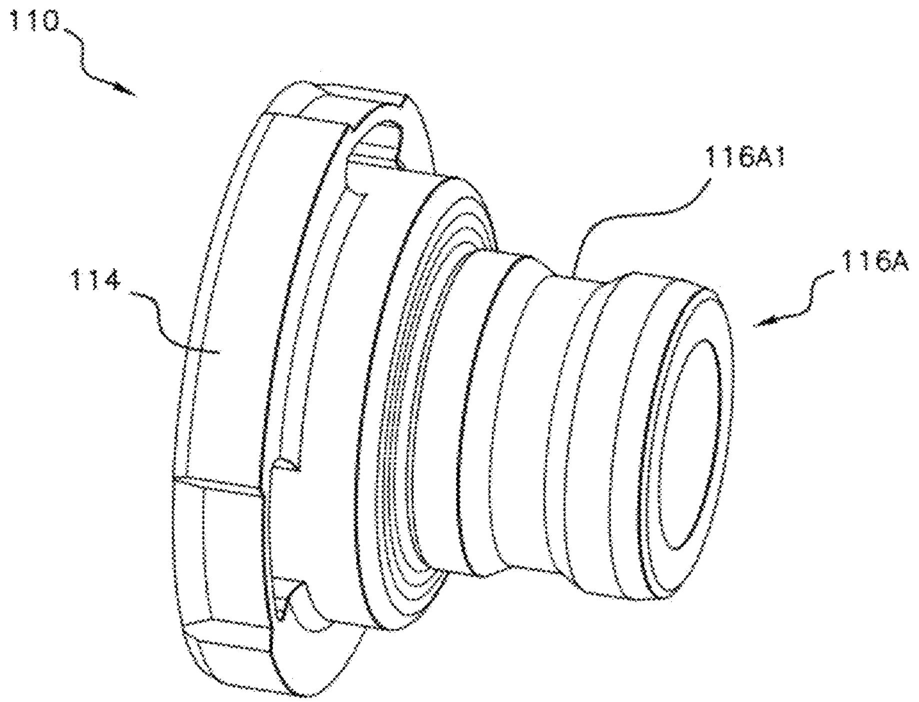
FIG. 4 is a rear perspective view of the target of FIG. 3.
Figure 5:
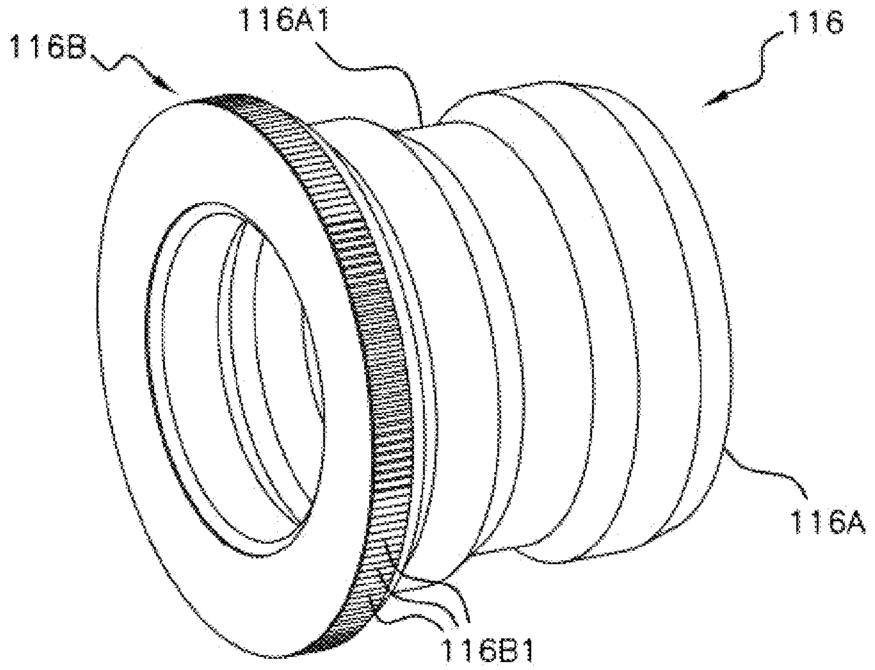
FIG. 5 is an isolated perspective view of the fixing element of the target of FIG. 3.
Figure 6:
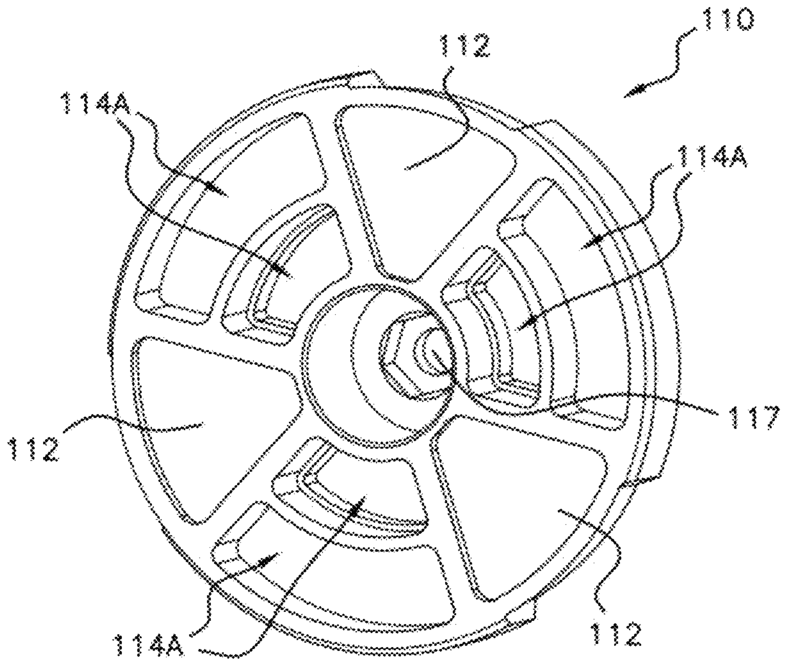
FIG. 6 is a front perspective view of a second example of a target according to the invention.
Figure 7:
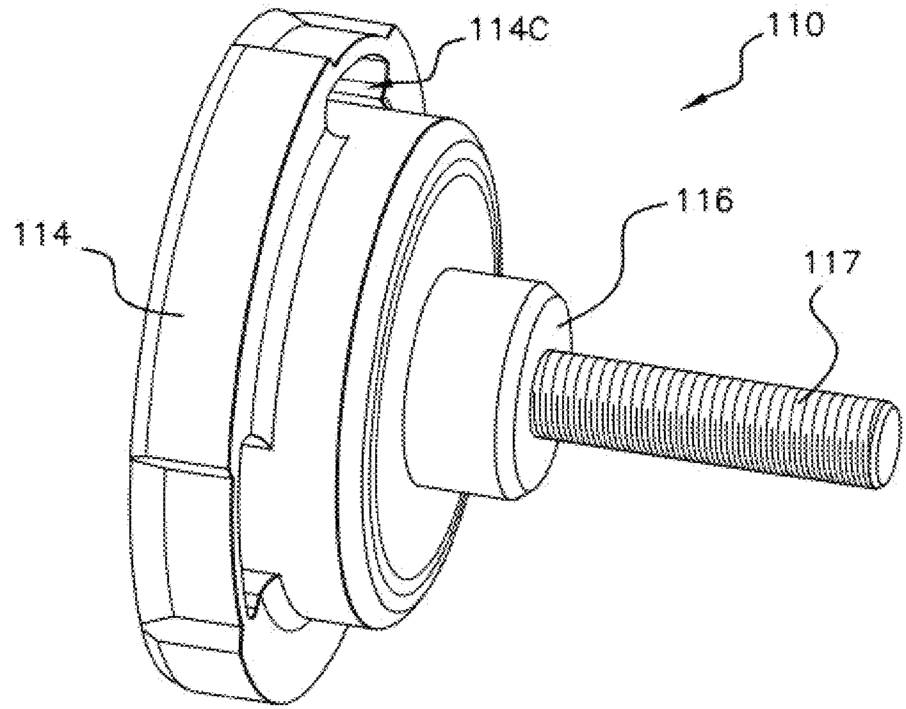
FIG. 7 is a rear perspective view of the target of FIG. 6.
Figure 8:
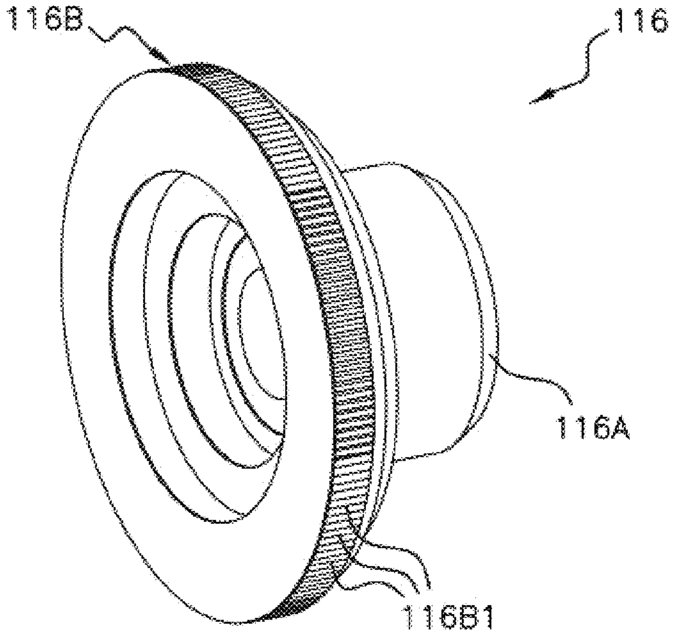
FIG. 8 is an isolated perspective view of the fixing element of the target of FIG. 6.

In the example of FIGS. 3 to 5, the insertion portion 116A comprises an annular groove 116A1 (FIG. 3) enabling easy mounting of the "press-fit" type with a circular rib of the shaft 20 (not visible). In the example of FIGS. 6 to 8, the insertion portion 116A has an external surface designed to be push-fitted into the hollow cylindrical portion of the end 20A of the shaft 20 (FIG. 8) and allows the passage of a screw 117 through its center so as to fix the target 110 to the shaft 20.

In the two examples illustrated in FIGS. 3 to 5 and 6 to 8 respectively, the fixing element 116 comprises an attachment portion 116B (FIG. 5) distinct from the insertion portion 116A, and in the form of a ring, the longitudinal axis of which is coincident with the longitudinal axis of the insertion portion. The attachment portion 116B is equipped over the entirety of its external surface with ribs 116B1 (FIG. 5) extending along the longitudinal axis of the fixing element 116 and parallel to one another. In other words, in this nonlimiting example, the ring is notched and the notches extend along the longitudinal axis of the fixing element 116 so as to prevent any rotation of the body 114 with respect to the fixing element 116 once the attachment portion 116B has been overmolded.

In the two examples of FIGS. 3 to 5 and 6 to 8, the target 110 comprises three teeth 112. In other forms of embodiment, the target 110 could comprise one, two, four, five or more than five teeth 112. Each tooth 112 is made of metal, for example of stainless steel, of aluminum or of copper. Each tooth 112 has a shape of angular cross section, preferably with a thickness of between 0.6 mm and 2 mm.

The teeth 112 are evenly circularly distributed on the target 110. In the examples of the figures, the teeth 112 are identical but, in another form of embodiment, the teeth 112 could be of different shapes. In the example of FIG. 3, each tooth 112 has an angular width of 60°. In another form of embodiment, the angular width of the teeth 112 could have a different value.

The body 114 is made from a plastics material overmolded onto the teeth 112 and onto the attachment portion 116B. The body 114 has a circular shape. The spaces 114A between the teeth 112 are partially empty in order to save on material during the overmolding and lighten the weight of the target so as to reduce the need for a balancing step. These spaces may or may not pass all the way through.

The spaces 114A are delimited by hollowed shapes which serve to press the teeth 112 intimately against the faces of the cavities on the functional-face side of the target 110 in order to ensure the correct positioning and overall flatness of the teeth 112. This offers a significant advantage over a target produced by deep swaging (or "deep stamping" which is a known process) in the context of an inductive sensor which requires a high level of precision. The spaces 114A also enable the target 110 to be orientated, notably at the moment of a press-fit insertion.

In another form of embodiment (not illustrated), the body 114 and the fixing element 116 may be derived from the same overmolding material. In other words, the body 114 and the fixing element 116 may be a one-piece component obtained by injecting material for the overmolding of the teeth 112 into a mold.

The body 114 delimits at least one opening 114B passing through said body 114 as far as the fixing element 116 so as to allow the use of an insertion tool for inserting the target 110 in the end 20A of the shaft 20. This opening 114B, when it passes all the way through the target 110, may notably serve to allow the circulation of liquid coolant in certain types of vehicle 1 shaft 20, and to grasp and orientate the target 110 when it is being inserted, particularly using press-fitting.

With reference to FIG. 7, the body 114 comprises maintaining walls 114C serving to press the teeth intimately against the faces of the cavities on the functional-face side of the target in order to ensure the extremely good positioning and overall flatness of the teeth 112, something which proves to be important for an inductive-type sensor and to be a significant advantage over a target of the prior art produced by deep stamping.

In another form of embodiment (not illustrated), the end 20A of the shaft 20 could be solid and accept a push-fitted or screw-fastened target 110.

Example of Manufacture

Figure 9:
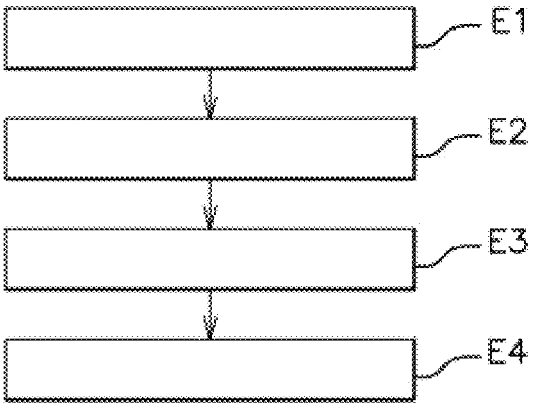
FIG. 9 schematically illustrates one embodiment of the method according to the invention.

In this example, described notably with reference to FIG. 9, the target 110 is manufactured using a two-part mold.

First of all, in a step E1, the metal teeth 112 are positioned in the lower part of the mold, evenly distributed, resting against the positioning members, for example V-shaped members, of the mold.

In a step E2, the fixing element 116 is positioned likewise in the lower part of the mold, for example using a maintaining pin, so that the longitudinal axis of the fixing element 116 is substantially aligned with the axis of even distribution of the teeth 112 (i.e. the axis about which the teeth 112 are distributed).

In a step E3, the upper part of the mold is then placed on the lower part in order to close the mold, then in a step E4 the overmolding plastics material is injected into the closed mold so as to form the body 114 which is overmolded over both the attachment portion 116B and, in full or in part, the metal teeth 112.

In another method of manufacture in which there would be no step E2, the body 114 and the fixing element 116 could both be formed by injecting material into the mold to form a one-piece component of the desired shape.

When the teeth are pre-positioned in the lower cavity of the mold, substantially offset from the axis to make them easier to insert into the tooling, the amount by which the teeth 112 are offset from the center as they are positioned in the mold may be defined by the magnitude of a cone of the mold. Thus, a relatively large cone size means that the tooth 112 can be comfortably distanced from its Vs, making it very much easier to pre-insert and then bring into its final position. Upon closure of the mold, the molding cavity in the upper part of the mold slides, via its cone, over a portion of the edge corner on the large-diameter side of the tooth 112, which edge corner involves the opposite face from the functional face of the target 110, to the point of blunting this (non-functional) edge corner slightly so that the lateral surfaces of each tooth 112 come into contact with, and therefore into position on, the V-shaped bearing faces of the mold, thereby ensuring excellent positioning of the tooth 112 with respect to the axis of the shaft 20, and doing so with very good repeatability. Such positioning is important, notably with regard to inductive technology. The method makes it possible to avoid damaging the functional edge corners of the teeth 112, which are preferably sharp edges all around the functional face.

The target 110 according to the invention makes it possible to achieve precise positioning of each tooth 112 with respect to the sensor 120 both along the axis of the shaft 20 and in the two other directions.

During a press-fit mounting of the target 110 on the end of the shaft, the insertion tool (which has not been depicted but is known per se) comes to bear against the fixing element 116 and then allows the push-fitting without damaging the plastic part of the target 110.

The invention claimed is:

1. A target for a shaft of a motor vehicle, said target being configured to be mounted on a free end of said shaft and comprising at least one metal tooth, a body supporting said at least one metal tooth and a fixing element comprising an insertion portion configured to be mounted at least partly on said end of the shaft, the body being overmolded, at least in part, around the at least one tooth, the body comprising:
- at least one notch formed on an outer circumference of the body,
- at least one void disposed within the body, adjacent the at least one metal tooth, and defining maintaining walls,
- the target being one wherein the maintaining walls press the at least one tooth intimately against faces of cavities on the functional-face side of the target in order to ensure the flatness of at least one tooth.

2. The target as claimed in claim 1, wherein the fixing element and the body—are derived from the same overmolding material.

3. The target as claimed in claim 1, wherein the body delimits at least one opening passing through said body as far as the fixing element so as to allow the use of an insertion tool for inserting the target in the end of the shaft.

4. The target as claimed in claim 1, said target comprising a plurality of teeth.

5. The target as claimed in claim 4, wherein the teeth are evenly distributed.

6. A motor vehicle comprising a drive shaft equipped with a target as claimed in claim 1.

7. The target as claimed in claim 1, said target comprising two, three, four or five teeth, overmolded in the body.

8. A method for manufacturing a target as claimed in claim 1, said method comprising the steps of positioning the at least one metal tooth in a lower part of a mold, placing the upper part of the mold on the lower part, and molding at least part of the body around the at least one metal tooth.

9. A target for a shaft of a motor vehicle, said target being configured to be mounted on a free end of said shaft and comprising at least one metal tooth, a body supporting said at least one metal tooth and a fixing element comprising an insertion portion-configured to be mounted at least partly on said end of the shaft, the body being overmolded, at least in part, around the at least one tooth, the target being one wherein the body comprises maintaining walls serving to press the at least one tooth intimately against faces of cavities on the functional-face side of the target in order to ensure the flatness of at least one tooth,
- wherein the fixing element comprises an attachment portion distinct from the insertion portion and equipped with at least one relief, the body being overmolded around said attachment portion.

10. The target as claimed in claim 9, wherein the attachment portion is of circular shape.

11. The target as claimed in claim 9, wherein the at least one relief of the attachment portion is a rib, a notch or a striation.

12. The target as claimed in claim 10, wherein the at least one relief of the attachment portion is a rib, a notch or a striation.

* * * * *